United States Patent [19]
Kawashima

[11] 3,898,466
[45] Aug. 5, 1975

[54] DEVICE FOR MEASURING NEUTRON FLUX

[75] Inventor: Katsuhiko Kawashima, Amagasaki, Japan

[73] Assignee: Mitsubishi Denki Kabushiki Kaisha, Japan

[22] Filed: Aug. 3, 1973

[21] Appl. No.: 385,250

[30] Foreign Application Priority Data
Aug. 9, 1972   Japan.................................. 47-79668

[52] U.S. Cl. ................. 250/390; 250/385; 250/392
[51] Int. Cl. ............................................. G01t 3/00
[58] Field of Search ............ 250/385, 390, 391, 392

[56] References Cited
UNITED STATES PATENTS
2,986,636   5/1961   Carlson et al........................ 250/385
3,197,637   7/1965   Kronenberg......................... 250/392
3,760,183   9/1973   Neissel............................. 250/390 X Primary Examiner—Archie R. Borchelt
Attorney, Agent, or Firm—Robert E. Burns; Emmanuel J. Lobato; Bruce L. Adams

[57] ABSTRACT

The disclosed device comprises a gamma ray-compensated ionization chamber for producing a first output current caused from the irradiation with a neutron flux and gamma rays and a second output current substantially caused from the gamma rays alone. The second output current is amplified by an adjustable gain current amplifier having a wide dynamic range and then the second output current amplified is substracted from the first output current. The difference current provides a measure of the neutron flux. The amplifier has its amplification factor adjusted so as to increase the gamma compensation effect.

10 Claims, 4 Drawing Figures

PATENTED AUG 5 1975　　3,898,466

DEVICE FOR MEASURING NEUTRON FLUX

BACKGROUND OF THE INVENTION

This invention relates to a device for measuring a neutron flux from a reactor core and more particularly to such a device employing a gamma ray-compensated ionization chamber as a neutron detector.

In devices for measuring neutron flux near the reactor core, it is generally required to measure a neutron flux in a wide range extending from the start-up range to the full power operating level, that is, up to $10^{10}$ or $10^{12}$. Namely the reaction rate may range up to from 10 to 12 orders of magnitude. Since it is usually difficult to measure neutron fluxes in such a wide range of the reaction rate by a single measuring device, it is commonly practiced to divide the measuring range into source range, intermediate range and power range and use one neutron measuring device suitable for each of those ranges. The present invention is concerned with the intermediate range device.

In the measurement of neutron flux in the intermediate range, it is well known that gamma rays involved cause an error in measurement. This is because neutron flux is low in the lower part of the intermediate range and the gamma rays relatively greatly affect the measurement. On the other hand, in the power range wherein the neutron flux is increased, the effect of gamma rays is usually out of the question. Thus it is necessary to provide measuring devices for measuring a neutron flux in the intermediate range with compensation of any error due to gamma rays involved.

Conventional gamma ray-compensated devices for measuring neutron fluxes have employed the gamma ray-compensated ionization chamber (which is generally abbreviated to a "CIC") as the neutron-flux detector. Such as CIC includes a first volume portion responsive to both a neutron flux to be measured and gamma rays introducing an error into the measurement, and a second volume portion substantially responsive to the gamma rays alone but not to the neutron flux. Then the substration has been directly conducted between the first and second output currents provided by the first and second volume portions respectively thereby to offset or compensate any erroneous current component contained in the first output current, that is to say, a current component caused from the gamma rays, by the second output current. In order to sufficiently offset or compensate the erroneous current component, it has been required to construct the CIC with an extremely high degree of accuracy. However since such an accuracy has its upper limit, the compensation effect cannot have been sufficiently accomplished. Although there have been already proposed a few attempts to improve the compensation effect, they have been unable to exhibit the compensation effect sufficiently for practical purposes.

It will readily be understood that, if the first volume portion would be constructed so as to be responsive to neutron fluxes along that the second volume portion may be omitted. However the first volume portion is responsive not only to neutron fluxes but also to gamma rays so that the second volume portion is required to be included in the device.

SUMMARY OF THE INVENTION

Accordingly it is an object of the present invention to provide a new and improved device employing a CIC to measure a neutron flux wherein the compensation effect is exhibited sufficiently for practical purposes.

The present invention accomplishes this object by the provision of a device for measuring a neutron flux, comprising, in combination, a gamma ray-compensated ionization chamber including a first volume portion responsive to both a neutron flux and gamma ray to produce a first output current, and a second volume portion responsive to the gamma rays but not substantially to the neutron flux to produce a second output current, an amplification adjustable current amplifier connected to the second volume portion of the ionization chamber to amplify the second output current, a coupling circuit connected to both the first volume portion of said ionization chamber and said current amplifier to combine the first output current from the first volume portion with an amplified output current from the current amplifier to provide a current difference between the output currents, and measuring means connected to the coupling circuit to measure a neutron flux on the basis of the current difference from the coupling circuit.

In a preferred embodiment of the present invention the ionization chamber may includes a first, a second and a third electrode plate disposed in spaced parallel relationship, the first and second electrode plates forming the first volume portion therebetween, the second and third electrode plates forming the second volume portion, a source of DC voltage connected to the second electrode plate. The current amplifier may comprises a logarithmic amplifier circuit including an operational amplifier, a logarithmic conversion transistor for logarithmically amplifying the second output current and an antilogarithmic conversion transistor connected to the output of the operational amplifier, the biasing means for controllably applying a biasing voltage to the antilogarithmic element to adjust the amplification of the current amplifier.

BRIEF DESCRIPTION OF THE DRAWING

The present invention will become more readily apparent from the following detailed description taken in conjunction with the accompanying drawing in which.

DESCRIPTION OF THE PREFERRED EMBODIMENT

Figure 1:
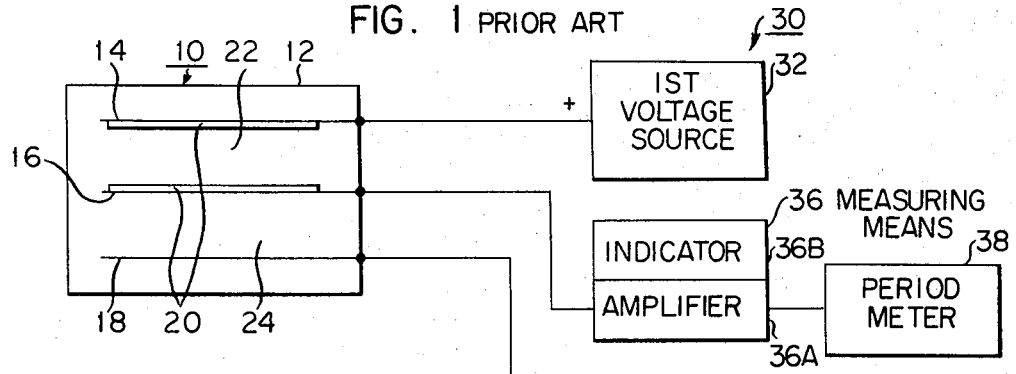
FIG. 1 is a block diagram of a device for measuring a neutron flux in an intermediate range of a nuclear instrumentation according to the principles of the prior art.

For a better understanding of the present invention, a conventional device for measuring a neutron flux will now be described with reference to FIGS. 1 and 2 of the drawing. The arrangement illustrated comprises a neutron detector in the form of a gamma ray-compensated ionization chamber (or "CIC") generally designated by the reference numeral 10 and including an enclosure 12 and three electrode plates 14, 16 and 18 disposed in spaced parallel relationship within the enclosure 12 with the electrode plate 16 interposed between the electrode plates 14 and 18. The opposite electrode plates 14 and 16 have disposed on the opposite surfaces thereof a coatings 20 formed of any suitable material responsive to incident neutrons to cause a nuclear reaction. The electrode plates 14 and 16 form a first volume portion 22 therebetween while the electrode plates 16 and 18 form a second volume portion 24 therebetween with a gas filling both volume portions 22 and 24.

The CIC 10 is electrically connected to a measuring circuit generally designated by the reference numeral 30. The measuring circuit 30 comprises a first source 32 of direct current (DC) voltage for applying a high DC voltage with the positive polarity to the electrode plate 14, a second source 34 of DC voltage for applying a voltage with the negative polarity to the electrode plate 18, and measuring means 36 electrically connected to the intermediate electrode plate 16. The measuring means 36 includes an amplifier 36A for amplifying a signal current flowing through the electrode plate 16 and an indicator 36B having applied thereto the amplified current or voltage from the amplifier 36A to indicate a neutron flux being measured. The amplified current or voltage from the amplifier 36A is also supplied to a period meter 38 for displaying a reactor period.

The operation of the arrangement as shown in FIG. 1 will now be described in conjunction with FIG. 2. When the CIC 10 has been installed so that a neutron flux is measured in an intermediate range a neutron flux and gamma rays affect both the first and second volume portions 22 and 24 respectively within the enclosure 12. More specifically, the neutron flux irradiates the first volume portion 22 to cause a nuclear reaction in the material of the coatings 18 to form alpha particles or fission fragments. The alpha particles or fission fragments thus formed ionize the gas within the first volume portion 22. As a positive voltage from the first source 32 is applied across the electrode plates 14 and 16, the ionization of the gas causes an ionization current $I_n$ between both electrode plates having a magnitude proportional to a intensity of the neutron flux being measured. The ionization current $I_n$ flows toward the electrode plate 16. On the other hand, the gamma rays along with the neutron flux irradiate the first volume portion 22 to directly ionize the gas therein. This ionization of the gas also causes an ionization current $I_\gamma$ which, in turn, flows toward the electrode plate 16. Thus the sum of the ionization currents $I_n$ and $I_\gamma$ flows through the first volume portion and toward the electrode plate 16.

Regarding the second volume portion 24, the opposite electrode plates 16 and 18 forming that volume portion have no coating 20 disposed on the opposite surfaces thereof so that only an ionization current $I_\gamma'$ flows through the second volume portion 24 caused from those gamma rays irradiating that portion with no flow of ionization current caused from the neutron flux. Because the voltage of the electrode plate 18 is negative with respect to that of the electrode plate 16, the ionization current $I_\gamma'$ is a current leaving the electrode plate 16.

Under these circumstances, the amplifier 36A has flowing thereinto a signal current $I_s$ expressed by $I_s = I_n + I_\gamma - I_\gamma'$ on the assumption that a direction in which a current flows into the electrode plate 16 is positive.

If the CIC 10 is constructed so as to meet the relationship $I_\gamma = I_\gamma'$ then the signal current $I_s$ becomes equal to the ionization current $I_n$. That is, $I_s = I_n$ is held. This means that the measurement of a neutron flux can be made without an error due to the gamma rays.

However it is practically impossible to construct the CIC 10 to hold $I_\gamma = I_\gamma'$ under any condition.

As will be well known, a gamma ray-compensation ratio is defined by $(I_\gamma - I_\gamma')/I_\gamma$. Thus the compensation ratio is zero and therefore minimum for $I_\gamma = I_\gamma'$. In conventional CIC's, the actual value of the gamma ray compensation ratio has ranged only from 0.1 to 0.01 and the compensation ratio of practical CIC's has been only of the order of 0.05.

Previously there has been proposed various attempts to improve the gamma ray-compensation ratio. For example, there are known mechanical means for mechanically adjusting the volume defined by the electrodes 16 and 18, electrical means for partly weakening an intensity of an electric field established between the electrode plates 16 and 18 to leave the ionization current with an unsaturated portion while regulating the voltage across the source 34 to adjust the magnitude of the unsaturated portion and so on. Those means have only given the figure of the compensation ratio as above described.

The compensation ratio of conventional CIC's has amounted only to a magnitude ranging from 0.1 to 0.01 as above described. This has resulted from the fact that the suitable fine adjustment function has not been able to be imparted to the CIC's. The present invention contemplates to provide instruments capable of practically providing the compensation ratio of from 0.01 to 0.001. In other words, the invention is to improve the compensation ratio by providing fine adjustment means in the form of an electronic circuit.

Figure 3:
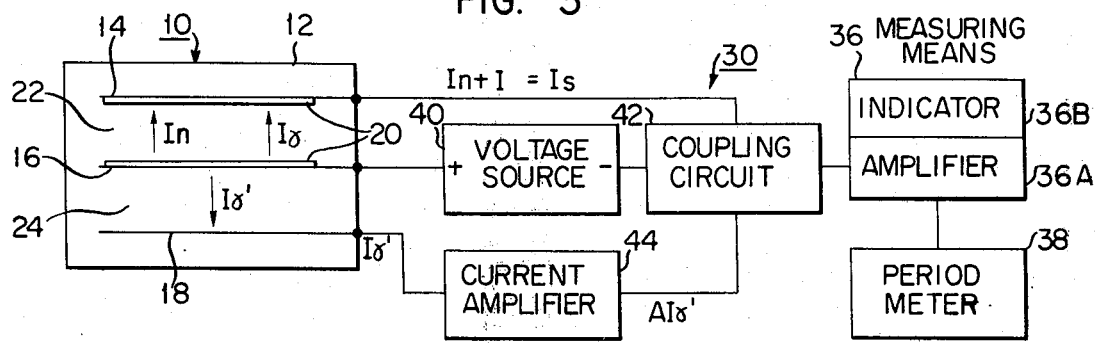
FIG. 3 is a block diagram of a device for measuring a neutron flux in the intermediate range according to the principles of the present invention.

Referring now to FIG. 3 wherein like reference numerals designate the components corresponding or identical to those shown in FIG. 1, there is illustrated one embodiment of the present invention. The arrangement illustrated comprises a neutron detector or a CIC 10 and a measuring circuit 30. As in the arrangement of FIG. 1, the CIC 10 includes an enclosure 12 and three electrode plates 14, 16 and 18 formed into flat sheets of any suitable metal such as aluminum or titanium and disposed in opposite relationship at substantially equal intervals of from 2 to 5 milimeters. The electrode plates 14 and 16 are provided on the opposite surfaces with coatings 20 of any suitable material responsive to neutrons such as a neutron absorber for example $B^{10}$ or fissile material for example, $U_{233}$, $U_{235}$ or $Pu^{239}$. A pair of first and second volume portions 22 and 24 respectively formed between the electrode plates 14 and 16 and between the electrode plates 16 and 18 are filled with a common gas such as nitrogen, argon or helium.

The measuring circuit 30 includes a source 40 of high DC voltage having a positive terminal connected to the central electrode plate 16 rather than the end electrode plate 14 and a negative terminal connected to the common earth of the measuring circuit 30. The source 40 is of a constant voltage type and provides a DC voltage high enough to saturate an ionization current within the CIC 20. That voltage normally ranges from 200 to 800 volts. An output current delivered from the electrode plate 14 in the manner such as above described in conjunction with FIG. 2 is connected directly to the coupling circuit 42 while an output current similarly delivered from the electrode plate 18 is connected to the coupling circuit 42 through an amplifier 44 adjustable in amplification factor.

The coupling circuit 42 may be a subtraction circuit or a junction as the case may be. More specifically, with the output currents from the electrode plates 14 and 18 identical in polarity to each other, the coupling circuit is a subtraction circuit for subtracting one from the other of the currents. Alternatively, with the output currents reversed in polarity from each other, the coupling circuit is may be merely a junction. Both currents will flows into the junction to provide a difference therebetween.

The coupling circuit 42 is connected to measuring means 36 subsequently connected to a period meter 38. The measuring means and period meter 36 and 38 respectively are identical to those shown in FIG. 1.

Figure 2:
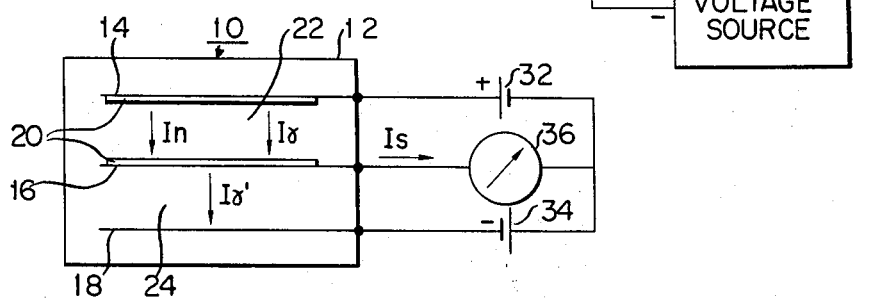
FIG. 2 is a schematic diagram useful in explaining the principles of measurement effected by the device shown in FIG. 1.

As will readily be understood from the description for FIG. 2, ionization currents $I_n$ and $I_\gamma$ generated in the first volume portion 22 flow into the electrode plate 14 while an ionization current $I_\gamma'$ generated in the second volume portion 24 flows into the electrode plate 18. An output current $I_s'$ from the electrode plate 14 can be expressed by $I_s' = I_n + I_\gamma$ and is directly applied to the coupling circuit 42. An output current from the electrode plate 18 is equal to the ionization current $I_\gamma'$ and is applied to the amplifier 44 where it is amplified. The amplified current from the amplifier 44 is supplied to the coupling circuit 42. Assuming that the amplifier 42 has an amplification factor of $A$, the current output from the amplifier 42 is expressed by $AI_\gamma'$. Thus the coupling circuit 42 provides an output current $I$ equal to a difference between the currents $I_s'$ and $AI_\gamma'$. If the output current I from the coupling circuit 42 is identical in polarity to the output current $I_s$, then the output current $I$ can be expressed by $$I = I_s' - AI_\gamma' = I_n + (I_\gamma - AI_\gamma')$$

In the above equation, the current $(I_\gamma - AI_\gamma')$ can have a sufficiently small magnitude by properly adjusting the amplification factor $A$. This is because the $A$ is adjustable. Therefore substantially only the current $I_n$ will be measured.

From the gamma ray-compensation ratio as above defined it can be appreciated that, in the arrangement of FIG. 2, the gamma ray-compensation ratio is to be defined by $(I_\gamma - AI_\gamma')/I_\gamma$. Therefore by properly adjusting the amplification factor $A$, the compensation ratio can actually range from 0.01 to 0.001. In other words, the present invention can improve the gamma ray-compensation ratio by one order of magnitude.

In practicing the present invention, the optimum amplification factor or gain $A$ of the current amplifier 44 can be determined in the following manner: First the CIC 10 is irradiated with a radioactive radiation including only gamma rays but not any neutron flux. This results in the generation of an output current $I_\gamma$ from the electrode plate 14 and of an output current $I_\gamma'$ from the electrode plate 18. Then the current $I_\gamma$ and $I_\gamma'$ are actually measured to determine the amplification factor $A$ by the measured $I_\gamma'$ magnitude divided by the measured $I_\gamma$ magnitude or $I_\gamma'/I_\gamma = A$.

The present invention is impossible to give a gamma ray-compensation ratio equal to or less than 0.001 for the following reasons: The structural stability of the CIC 10, effect of gamma ray energy dependence, the stability of the amplification factor of the amplifier 44 etc.

It has been found that the CIC used with the present invention is required only to have a gamma raycompensation ratio $(I_\gamma - I_\gamma')/I_\gamma$ of about 0.05 and unnecessary to render it smaller than the figure just specified. However, it is essential that the CIC have a low gamma ray energy dependence, that is to say develop a, small change in compensation ratio due to a variation in gamma ray energy and also that it be formed of a material less in the tendency to become radioactive. To this end, the first and second volume portions in the CIC can be symmetrical with respect to the central electrode plate 16 in terms of shape and dimension, and the electrode plates can be formed of aluminum or titanium.

In order to render the present invention more effective for measuring a neutron flux, the current amplifier 42 should have a measuring range of five decades of magnitude or more without the sensitivity changed, and be possible to be adjust in gain or amplification factor. In the past, there has been available any amplifier having such a wide measuring range. Current amplifiers previously available have been operative to amplify the input current to produce a corresponding voltage signal and then to convert the voltage signal to a current by the use of resistance elements. The measuring range of such current amplifiers has been subject to a limitation due to both a dynamic range of voltages generated in the amplifier and the stability of an offset voltage for the input of the amplifier. The measuring range of at most about five orders of magnitude has been obtained with conventional operational amplifiers for amplifying minute current in the order of $10^{-11}$ ampere required for the present invention.

Figure 4:
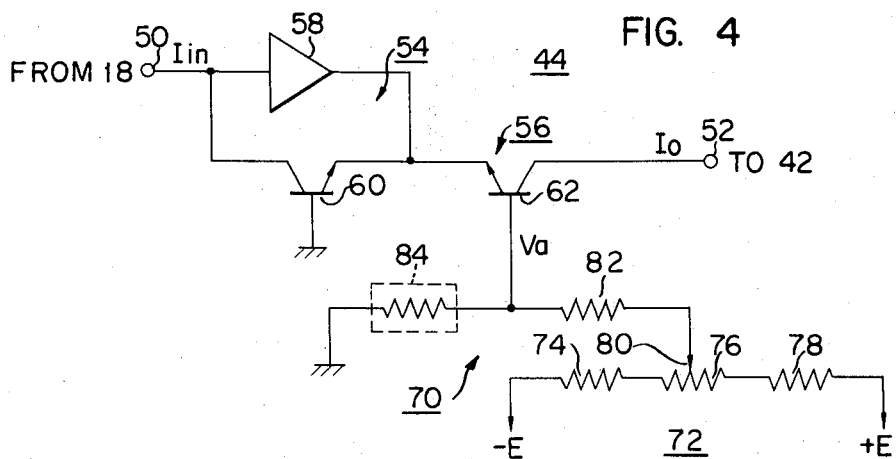
FIG. 4 is a circuit diagram of the current amplifier shown in FIG. 3.

The current amplifier 44 is preferably of a logarithmic type in order to render its measuring range very wide and a particularly suitable arrangement thereof is shown in FIG. 4. As shown in FIG. 4, the amplifier 44 includes an input terminal 50, an output terminal 52, and a logarithmic amplifier circuit 54 and an antilogarithmic conversion circuit 56 serially interconnected across both terminals. The input terminal 50 is connected to the electrode plate 18 in the CIC 10 while the output terminal 52 is connected to the coupling circuit 42.

The logarithmic amplifier circuit 54 includes an operational amplifier 58 and a transistor 60 connected across the amplifier 58. The transistor 60 shown in FIG. 4 as being of the NPN type forms a logarithmic conversion element and includes a collector electrode connected to both the input terminal 50, and an input to the operational amplifier 58, an emitter electrode connected to output of the operational amplifier 58 and a base electrode connected to ground. The logarithmic amplifier circuit 54 is operative to amplify an input current $I_{in}$ into a corresponding logarithmic output.

The antilogarithmic conversion circuit 56 includes a transistor 62 shown in FIG. 4 as being of the NPN type. The transistor 62 forms an antilogarithmic element and includes an emitter electrode connected to the emitter electrode of the transistor 60, a collector electrode connected to the output terminal 52 and a base electrode having applied thereto a biasing voltage $V_a$ from an amplification determining circuit or gain control circuit 70 as will be subsequently described. The circuit 56 is operative to convert the logarithmic output from the logarithmic amplifier circuit 54 to a corresponding linear output which, in turn, supplies to the output terminal 52 an output current $I_o$ into which an input current has been linearly amplified.

As shown in FIG. 4, the amplification determining circuit 70 includes a bias adjusting circuit 72 consisting of a fixed resistor 74, a variable resistor 76 shown as a potentiometer and a fixed resistor 78 serially connected in the named order across a biasing source represented by $+E$ and $-E$. The biasing source in this case, supplies a voltage of 24 volts for example. The variable resistor 76 includes a movable tap 80 connected to the base electrode of the transistor 64 through a fixed resistor 82. Also the base electrode of the transistor 64 is connected to ground through a temperature compensation resistor 84 having a magnitude of resistance directly proportional to an absolute temperature. Thus the resistor 84 has a magnitude of resistance of $\rho T$ where $\rho$ represents a temperature coefficient of resistance in ohms/°K and T represents an absolute temperature.

In the example illustrated, the temperature compensation resistor 84 includes a copper wire-wound resistor of 100 ohms and a metal film resistor of 14.2 ohms serially interconnected. The metal film resistor is low in thermal coefficient of resistance. The resistor 82 has a magnitude of resistance on the order of 22 kilohms higher than that of the resistor 84. If desired, the resistors may have magnitudes of resistance different from those just specified.

It has been found that the bias adjusting circuit 72 having the circuit parameters as above described can adjust the amplification factor A of the current amplifier 44 within a range up to about hundred times.

The current amplifier 44 operates as follows: It is well known that the collector current $I_c$ for transistors can be expressed by $$I_c = I_\gamma \exp \frac{q V_{BE}}{KT} \qquad (1)$$

where
$I_\gamma$ = saturated collector current for transistor
$V_{BE}$ = base-to-emitter voltage for transistor
$q$ = elementary charge
$K$ = Boltzmann's constant
$T$ = absolute temperature By using the equation (1), the output current $I_o$ at the output terminal 52 can readily be calculated at $$I_o = -I_{in} \frac{I_2}{I_1} \exp \frac{q V_a}{KT} \qquad (2)$$

where
$I_{in}$ = input current to input terminal 50
$I_1$ = saturated collector current for transistor 60
$I_2$ = saturated collector current for transistor 62
$V_a$ = voltage applied to base electrode of transistor 62

It is assumed that the input current $I_{in}$ is positive when it flows into the input terminal 50 and that the output current $I_o$ is positive when it flows out from the output terminal 52.

In the equation (2) the ratio of saturated collector current $I_2/I_1$ is scarcely changed with a temperature change while the exponent ($qV_a/KT$) is changed in accordance with the temperature, on the assumption that the $V_a$ remains unchanged. It is recalled that in the arrangement of FIG. 4, the resistor 84 has a certain thermal coefficient of resistance. Also the resistor 82 is much higher in resistance that the resistor 84. Thus it can be regarded that a current supplied through the resistor 82 is a constant current $I_a$. As a result, the voltage $V_a$ can be expressed by the equation $$V_a = \rho T I_a \qquad (3)$$

Substituting the equation (3) for the equation (2) gives $$I_o = -I_{in} \frac{I_2}{I_1} \exp \frac{q \rho I_a}{K} \qquad (4)$$

From the equation (4), it can be seen that the current amplifier 44 as shown in FIG. 4 has an amplification factor $A$ expressed by $$\frac{I_2}{I_1} \exp \frac{q \rho I_a}{K}.$$

Therefore this amplification factor $A$ can be controlled by changing the current $I_a$ through the displacement of the tap 80 along the potentiometer 76.

Since the current amplifier 44 has the output terminal 52 connected to the transistor 62, the output from the terminal 52 provides a good source of constant current as will readily be understood from the characteristics of the transistor 62. This source of constant current can deliver an output current not affected by the associated load. Also as shown by the results of logarithmic amplifiers presently employed, the logarithmic conversion element involved has a usable range of from eight to ten decades of magnitude so that the current amplifier 44 as shown in FIG. 4 has the same usable range as such a conversion element.

In order to impart to the current amplifier 44 an amplification factor A stabilized for a change in temperature, the transistors 60 and 62 and the temperature compensation resistor 84 may be preferably maintained in good thermally coupled relationship. For example, the transistor 60 and 62 may be disposed within a common enclosure to form a pair transistor which is, in turn, disposed in a single casing with the resistor 84.

From the foregoing it will be appreciated that a current amplifier is provided, with its amplification factor having a stability of about 0.001. As clearly seen in the equation (4), the current amplifier may have its amplification factor made smaller than one in accordance with the adjustment of the current $I_a$ including the reversal of its polarity from the positive to the negative. This is effective whenever it is required to render the amplification factor $A$ smaller than one in order to improve the gamma ray-compensation ratio.

In the arrangement of FIG. 3 including the current amplifier as shown in FIG. 4, the output current from the amplifier is opposite in polarity to the input current thereto and therefore to the current delivered from the electrode plate 14 in the CIC 10. Thus the coupling circuit 42 can be merely a junction into which the currents from the electrode plate 14 and the output current from the current amplifier 44 flow together.

From the foregoing it will be apparent that the present invention provides a device for measuring neutron fluxes having a gamma ray-compensation ratio improved to be as small as about one tenth of the compensation ratio previously obtained. Therefore the present invention is very effective for use in nuclear instrumentation for fast breeder reactors in which the gamma level is rather high.

While the present invention has been illustrated and described in conjunction with a single preferred embodiments thereof it is to be understood that various changes and modifications may be resorted to without departing from the spirit and scope of the invention.

What is claimed is:

1. A device for measuring a neutron flux, comprising, in combination, a biased gamma ray compensated ionization chamber including first means responsive in use to both a neutron flux and gamma rays to produce a first output current having components representative of the neutron flux and the gamma ray flux, and second means responsive to the gamma rays but substantially non-responsive to the neutron flux to produce a second output current representative of the gamma ray flux; a variable gain current amplifier connected to said second means of said ionization chamber to amplify said second output current to equal the component of the first output current representative of the gamma ray flux, a coupling circuit connected to both said first means of said ionization chamber and said current amplifier to provide a difference current equal to the difference between the first output current and the amplified second output current, and measuring means connected to said coupling circuit to determine the neutron flux by measuring the difference current.

2. A device for measuring a neutron flux as claimed in claim 1, wherein said ionization chamber includes a first, a second and a third electrode plate disposed in spaced parallel relationship therein, said second plate being disposed between said first and third plates, said first means comprising in combination said first and second electrode plates, and said second means comprising in combination said second and third electrode plates.

3. A device for measuring a neutron flux as claimed in claim 2, wherein a source of direct current voltage is connected to said second electrode plate whereby said first output current flows between said first and second electrode plates and said second output current flows between said second and third electrode plates.

4. A device for measuring a neutron flux as claimed in claim 1, wherein said current amplifier includes a logarithmic amplifier for logarithmically amplifying said second output current, and an antilogarithmic conversion circuit connected to said logarithmic amplifier circuit to convert the logarithmically amplified current to a current linearly proportional to said output current which is supplied to said coupling circuit.

5. A device for measuring a neutron flux as claimed in claim 4, wherein said current amplifier includes a gain control circuit having a variable resistor for adjusting the gain of said current amplifier.

6. A device for measuring a neutron flux as claimed in claim 5, wherein said gain control circuit comprises means to adjust a biasing voltage applied to said antilogarithmic circuit.

7. A device for measuring a neutron flux as claimed in claim 4, wherein said gain control circuit includes a temperature compensation resistor having a magnitude of resistance proportional to an absolute temperature.

8. In combination:
   a. a gamma ray compensated ionization chamber having means for developing in use a first signal having a component representative of a neutron flux incident thereon and a component representative of a gamma ray flux incident thereon and developing in use a second signal representative of only the gamma ray flux;
   b. means receptive of said second signal for developing an amplified second signal substantially equal to the component of said first signal representative of the gamma ray flux; and
   c. means receptive of said first signal and the amplified second signal for developing a difference signal representative of only the neutron flux and equal to the difference between said first signal and said amplified second signal.

9. In a combination according to claim 8 wherein said compensated ionization chamber having means for developing in use the first and second signals comprises means for developing electrical first and second signals.

10. In a combination according to claim 9 wherein said means for developing said amplified second signal comprises a variable gain amplifier.

* * * * *